United States Patent
Han et al.

(10) Patent No.: US 11,017,345 B2
(45) Date of Patent: May 25, 2021

(54) METHOD FOR PROVIDING DELIVERY ITEM INFORMATION AND APPARATUS THEREFOR

(71) Applicant: Eleven Street Co., Ltd., Seoul (KR)

(72) Inventors: Ju Hyeun Han, Yongin-si (KR); Young Seog Lee, Seoul (KR); Un Dong Chang, Gunpo-si (KR)

(73) Assignee: ELEVEN STREET CO., LTD., Seoul (KR)

( * ) Notice: Subject to any disclaimer, the term of this patent is extended or adjusted under 35 U.S.C. 154(b) by 342 days.

(21) Appl. No.: 15/991,665

(22) Filed: May 29, 2018

(65) Prior Publication Data
US 2018/0349842 A1 Dec. 6, 2018

(30) Foreign Application Priority Data
Jun. 1, 2017 (KR) .......................... 10-2017-0068492

(51) Int. Cl.
*G06Q 10/08* (2012.01)
*G06T 19/00* (2011.01)
(Continued)

(52) U.S. Cl.
CPC ......... *G06Q 10/0832* (2013.01); *G06F 21/31* (2013.01); *G06F 21/6245* (2013.01);
(Continued)

(58) Field of Classification Search
CPC . G06Q 10/0832; G06F 21/31; G06F 21/6245; G06K 7/10861; G06K 7/10881; G06K 7/1092; G06T 19/006
See application file for complete search history.

(56) References Cited

U.S. PATENT DOCUMENTS 6,505,169 B1 * 1/2003 Bhagavath ............. G06Q 30/02
705/14.66
7,158,666 B2 * 1/2007 Deshpande ............. H04N 5/272
348/E5.058
(Continued)

OTHER PUBLICATIONS

Martin Hirzer, "Marker detection For Augmented Reality Applications", Institute for Computer Graphics and Vision, Oct. 27, 2008 (Year: 2008).*
(Continued)

*Primary Examiner* — Omar Zeroual
(74) *Attorney, Agent, or Firm* — Fenwick & West LLP

(57) ABSTRACT

The present disclosure provides a method and system for allowing a receiver of a delivery item to view moving picture corresponding to the delivery item attached on the delivery item in an augmented reality form without unpacking the delivery item so as to allow to intuitively check the information of the delivery item. According to an aspect of an exemplary embodiment, a method of providing delivery item information in a device includes: activating a camera when an application program is executed; recognizing an identification code attached on a delivery item and photographed by the camera; requesting moving picture data corresponding to the identification code from a service server and receiving the moving picture data; and outputting moving picture corresponding to the moving picture data by superimposing on a real-time camera image acquired by the camera.

7 Claims, 10 Drawing Sheets

(51) Int. Cl.
   *G06F 21/62*   (2013.01)
   *G06F 21/31*   (2013.01)
   *G06K 7/10*    (2006.01)

(52) U.S. Cl.
   CPC ....... *G06K 7/1092* (2013.01); *G06K 7/10861* (2013.01); *G06K 7/10881* (2013.01); *G06T 19/006* (2013.01)

(56) References Cited

U.S. PATENT DOCUMENTS

| | | | | |
|---|---|---|---|---|
| 8,103,959 | B2* | 1/2012 | Cannon | G06F 3/011 715/753 |
| 8,547,401 | B2* | 10/2013 | Mallinson | A63F 13/22 345/633 |
| 8,797,353 | B2* | 8/2014 | Bregman-Amitai | H04W 4/00 345/633 |
| 9,355,499 | B1* | 5/2016 | Johnson | H04N 5/23229 |
| 9,443,147 | B2* | 9/2016 | Mei | H04N 21/4622 |
| 9,589,372 | B1* | 3/2017 | Bean | G06K 9/00744 |
| 9,652,895 | B2* | 5/2017 | Sumner | G06T 15/04 |
| 9,721,391 | B2* | 8/2017 | Monaghan | G06F 3/017 |
| 9,721,394 | B2* | 8/2017 | Rosenthal | H04N 5/232935 |
| 9,754,397 | B1* | 9/2017 | Piemonte | G06Q 20/123 |
| 10,019,846 | B1* | 7/2018 | York | G06F 3/0304 |
| 2003/0028433 | A1* | 2/2003 | Merriman | G06Q 30/0255 705/14.53 |
| 2004/0182925 | A1* | 9/2004 | Anderson | B07C 7/005 235/385 |
| 2006/0036502 | A1* | 2/2006 | Farrell | G06Q 20/208 705/23 |
| 2006/0161506 | A1* | 7/2006 | Stumm | G07B 17/00435 705/408 |
| 2008/0133659 | A1* | 6/2008 | Aldrey | G06Q 10/08 709/204 |
| 2009/0285483 | A1* | 11/2009 | Guven | G06Q 30/0603 382/181 |
| 2010/0238267 | A1* | 9/2010 | Izzat | H04N 13/361 348/43 |
| 2011/0055049 | A1* | 3/2011 | Harper | G06F 3/011 705/27.1 |
| 2011/0134108 | A1* | 6/2011 | Hertenstein | G06T 19/006 345/419 |
| 2011/0216179 | A1* | 9/2011 | Dialameh | G06K 9/00664 348/62 |
| 2011/0254861 | A1* | 10/2011 | Emura | H04N 5/23216 345/633 |
| 2012/0017238 | A1* | 1/2012 | Miller | G06T 7/194 725/32 |
| 2012/0022924 | A1* | 1/2012 | Runnels | G06Q 30/02 705/14.4 |
| 2012/0143361 | A1* | 6/2012 | Kurabayashi | H04R 5/04 700/94 |
| 2012/0230538 | A1* | 9/2012 | Caiman | G06F 16/583 382/103 |
| 2012/0256956 | A1* | 10/2012 | Kasahara | G06F 3/14 345/633 |
| 2012/0327117 | A1* | 12/2012 | Weller | G06T 19/006 345/633 |
| 2013/0026220 | A1* | 1/2013 | Whelihan | G06F 16/9554 235/375 |
| 2013/0032634 | A1* | 2/2013 | McKirdy | G16H 20/30 235/375 |
| 2013/0063487 | A1* | 3/2013 | Spiegel | G06Q 30/02 345/633 |
| 2013/0063620 | A1* | 3/2013 | Kim | G06K 7/1093 348/222.1 |
| 2013/0212453 | A1* | 8/2013 | Gudai | G06Q 30/02 715/202 |
| 2013/0317912 | A1* | 11/2013 | Bittner | G06T 19/006 705/14.64 |
| 2014/0100997 | A1* | 4/2014 | Mayerle | G06Q 30/0276 705/27.2 |
| 2014/0108136 | A1* | 4/2014 | Zhao | G06Q 10/0833 705/14.49 |
| 2014/0210857 | A1* | 7/2014 | Liu | G06T 7/246 345/633 |
| 2014/0223462 | A1* | 8/2014 | Aimone | A61B 5/369 725/10 |
| 2014/0247278 | A1* | 9/2014 | Samara | G06K 17/0016 345/633 |
| 2014/0253743 | A1* | 9/2014 | Loxam | G06T 11/00 348/207.1 |
| 2014/0267404 | A1* | 9/2014 | Mitchell | G06T 19/006 345/633 |
| 2014/0340423 | A1* | 11/2014 | Taylor | G06K 9/6202 345/633 |
| 2015/0009233 | A1* | 1/2015 | Phillips | G06T 19/006 345/633 |
| 2015/0012426 | A1* | 1/2015 | Purves | G06Q 20/321 705/41 |
| 2015/0022645 | A1* | 1/2015 | Bouazizi | H04N 13/122 348/51 |
| 2015/0070347 | A1* | 3/2015 | Hofmann | G06T 19/006 345/419 |
| 2015/0106225 | A1* | 4/2015 | Glass | G06Q 30/0641 705/26.7 |
| 2015/0348329 | A1* | 12/2015 | Carre | H04N 21/4784 345/633 |
| 2015/0379770 | A1* | 12/2015 | Haley, Jr. | G06T 19/006 345/633 |
| 2016/0050465 | A1* | 2/2016 | Zaheer | H04N 21/6581 725/34 |
| 2016/0063484 | A1* | 3/2016 | Carpenter | G06Q 20/3263 705/41 |
| 2016/0180590 | A1* | 6/2016 | Kamhi | G06K 9/00671 345/633 |
| 2016/0203645 | A1* | 7/2016 | Knepp | A63F 13/53 345/633 |
| 2017/0070779 | A1* | 3/2017 | Kim | H04N 21/4825 |
| 2017/0185596 | A1* | 6/2017 | Spirer | G06Q 30/0201 |
| 2017/0206711 | A1* | 7/2017 | Li | G06K 9/00671 |
| 2017/0330361 | A1* | 11/2017 | Fisher | G06T 16/00 |
| 2017/0352187 | A1* | 12/2017 | Haines | G06T 19/006 |
| 2018/0012630 | A1* | 1/2018 | Thomee | G06K 9/00624 |
| 2018/0060663 | A1* | 3/2018 | Baskin | G06F 16/5838 |
| 2018/0075883 | A1* | 3/2018 | Aroyo | G11B 27/102 |
| 2018/0165888 | A1* | 6/2018 | Duan | G06Q 20/00 |
| 2018/0174195 | A1* | 6/2018 | Agarwal | G06Q 30/0261 |
| 2018/0192160 | A1* | 7/2018 | Ravindran | H04N 21/23424 |
| 2018/0204060 | A1* | 7/2018 | Merchant | A63F 13/92 |
| 2018/0205999 | A1* | 7/2018 | Garrett | G06T 19/006 |
| 2018/0288396 | A1* | 10/2018 | Bouazizi | H04N 13/117 |
| 2018/0300917 | A1* | 10/2018 | Barnett | G06T 11/60 |
| 2018/0316910 | A1* | 11/2018 | Kashibuchi | H04N 13/167 |
| 2018/0322523 | A1* | 11/2018 | Letson | G06Q 30/0238 |
| 2019/0090035 | A1* | 3/2019 | Eksten | H04N 21/2405 |
| 2019/0244407 | A1* | 8/2019 | Wiesel | G06T 11/60 |
| 2019/0289084 | A1* | 9/2019 | Duan | H04L 63/0823 |
| 2019/0354766 | A1* | 11/2019 | Moore | G06F 40/169 |

OTHER PUBLICATIONS

F. Chehimi, "Augmented Reality 3D Interactive Advertisements on Smartphones," International Conference on the Management of Mobile Business., 2007 (Year: 2007).*

* cited by examiner

METHOD FOR PROVIDING DELIVERY ITEM INFORMATION AND APPARATUS THEREFOR

CROSS-REFERENCE TO RELATED APPLICATION

The present application claims priority to Korean Patent Application No. 10-2017-0068492, filed on Jun. 1, 2017, in the Korean Intellectual Property Office, which is incorporated herein in its entirety by reference.

TECHNICAL FIELD

The present disclosure relates to a method and apparatus for providing delivery item information. More particularly, the present disclosure relates to a method and system for allowing a receiver of a delivery item to view moving picture corresponding to the delivery item in an augmented reality form without unpacking the delivery item so as to allow to intuitively check the information of the delivery item.

BACKGROUND

The description in this section merely provides background information of embodiments of the present disclosure and is not intended to specify prior arts of the present disclosure.

As non-face-to-face transactions such as Internet shopping and home shopping are increasing, delivery services such as a postal parcel service, courier, and air cargo service are also expanding. According to current delivery services, the sender packs a delivery item in a paper box or plastic wrapping material to prevent the damage of the delivery item and attaches a waybill on an outer surface of a package, so that a carrier ships and delivers the delivery item package with reference to the waybill.

Generally, a barcode is printed on the waybill, and a delivery person responsible for the delivery item and records each step of a delivery process by scanning the barcode using a barcode scanner while performing the delivery process of the delivery item.

However, the conventional waybill has a problem that personal information of the receiver is printed on the waybill in addition to the barcode, and the information of the receiver may be exposed to many and unspecified persons during the delivery.

On the other hand, the delivered item remains in a state where it is difficult to check the contents through the box or plastic package even after the delivery is completed unless the packaging is removed. Thus, in case that the receiver of the delivery item is not the same as the orderer, the receiver may happen to receive an undesired item. Meanwhile, the orderer having received an ordered item cannot check a condition of the item before the packaging is removed.

Various computer systems for facilitating shipment and delivery of the delivery packages have been disclosed. For example, Korean laying-open patent publication No. 2014-31611 entitled HOME DELIVERY SYSTEM discloses a delivery system in which a device that scans a waybill transmits an identification code to a server to receive a delivery address and automatically input the delivery address into a navigation program to improve work efficiency. However, the conventional systems and methods are focused on improvement of the work efficiency and are not concerned with showing contents or condition of the delivery item packages.

SUMMARY

Provided are a method and apparatus, which allow a shipper or sender to attach an identification code on which personal information is not exposed, discriminate a legitimate receiver who photographs the identification code and request information related to the delivery item, and provide the legitimate receiver with moving picture data corresponding to the identification code.

Provided are a method and apparatus which allow the receiver of the delivery item package to intuitively and easily view the moving picture corresponding to the delivery item by only photographing the identification code attached on the delivery item package.

Provided are a method and apparatus which allow the receiver of the delivery item package to view the moving picture corresponding to the delivery item in an augmented reality form at a receiver device and provide unusual experience to the receiver user.

Additional aspects will be set forth in part in the description which follows and, in part, will be apparent from the description, or may be learned by practice of the presented exemplary embodiments.

According to an aspect of an exemplary embodiment, a method of providing delivery item information in a device includes: activating a camera when an application program is executed; recognizing an identification code attached on a delivery item and photographed by the camera; requesting moving picture data corresponding to the identification code from a service server and receiving the moving picture data; and outputting moving picture corresponding to the moving picture data by superimposing on a real-time camera image acquired by the camera.

The moving picture data may include at least one of: detailed information of the delivery item, advertisement information related with the delivery item, and information designated by a user who ordered the delivery item.

The operation of outputting the moving picture may include: searching a position of a marker in the identification code in the real-time camera image; setting a playback frame according to the position of the marker; and indicating the playback frame in the real-time camera image and outputting the moving picture by superimposing the moving picture in the playback frame.

The operation of setting the playback frame may include an operation of tracking the position of the marker that changes as the camera moves to translate or rotate the playback frame according to movement of the marker.

The operation of outputting the moving picture may include: determining whether a designated area exists in the moving picture; and, when it is determined that the designated area exists in the moving picture, receiving a predetermined data from the service server and outputting the predetermined data by superimposing on the designated area.

The operation of requesting and receiving the moving picture data may include: transmitting user identification information to the service server and receiving the moving picture data corresponding to the user identification information.

The user identification information may include at least one of a phone number assigned to the device, facial identification information recognized through a front camera, and biometric information recognized through a biometric module.

The operation of requesting and receiving the moving picture data may include: receiving a moving picture list corresponding to the identification code from the service server; displaying the moving picture list by combining the moving picture list with the real-time camera image; and, in response to a user input choosing a specific moving picture, requesting the requesting specific moving picture data corresponding to the specific moving picture from a service server and receiving the specific moving picture data. In such a case, the specific moving picture received from the service server may be output by superimposing on the real-time camera image.

According to another aspect of an exemplary embodiment, a method of providing delivery item information in a service server includes: receiving, from a device, a request for moving picture data corresponding to an identification code attached on a delivery item and photographed by a camera of the device as an application program is executed; determining a moving picture corresponding to the identification code; and transmitting the moving picture data corresponding to a determined moving picture to the device.

The operation of determining the moving picture may include: checking user identification information of the device; and choosing the determined moving picture according to the user identification information among a plurality of moving pictures corresponding to the identification code.

The user identification information may be received from the device or may be determined by using the user identification information.

The operation of determining the moving picture may include: transmitting a moving picture list to the device when there are a plurality of moving pictures corresponding to the identification code; and receiving, from the device, the request for the moving picture data for a specific moving picture chosen from the moving picture list as the determined moving picture.

According to an aspect of an embodiment, provided is a non-transitory computer-readable storage medium having stored therein a program which, when executed by a processor, causes the processor to perform the method of providing delivery item information.

According to an aspect of an exemplary embodiment, an apparatus for providing delivery item information includes: a camera control module configured to activate a camera when an application program is executed and photograph an identification code attached on a delivery item; and an application control module configured to recognize the identification code, request moving picture data corresponding to the identification code from a service server, receive the moving picture data from the service server, and control a display operation such that a moving picture corresponding to the moving picture data is superimposed on a real-time camera image acquired by the camera.

According to another aspect of an exemplary embodiment, an apparatus for providing delivery item information includes: a moving picture data control module configured to generate and maintain moving picture data corresponding to an identification code; and a service control module configured to receive, from a device, a request for moving picture data corresponding to the identification code attached on a delivery item and photographed by a camera of the device, determine a moving picture corresponding to the identification code, and transmit the moving picture data corresponding to a determined moving picture to the device.

According to the present disclosure, the receiver may safely receive the delivery item without exposure of the personal information since the personal information may not be exposed on the delivery item package.

Also, the receiver may intuitively and easily view the moving picture corresponding to the delivery item and check the contents and condition of the delivery item by only photographing the identification code attached on the delivery item package.

Further, since the receiver of the delivery item package may view the moving picture corresponding to the delivery item in an augmented reality form at the receiver device, the user may enjoy a unusual experience.

The present disclosure may provide an advertisement moving picture corresponding to the delivery item, and thus may increase the effectiveness of the advertisement and provide a new advertising medium.

Various advantageous effects other than those described above may be disclosed explicitly or implicitly in the following descriptions of embodiments according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
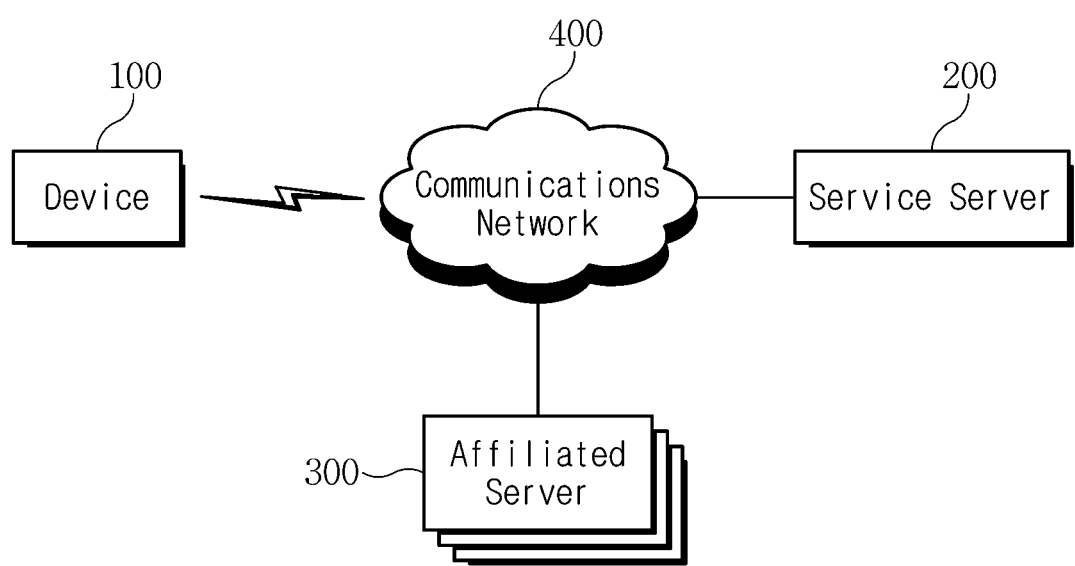
FIG. 1 is a block diagram of a system for supporting a method of providing delivery item information according to an embodiment of the present disclosure.

The drawings described herein are for illustration purposes only and are not intended to limit the scope of the present disclosure in any way.

DETAILED DESCRIPTION

Reference will now be made in detail to exemplary embodiments, examples of which are illustrated in the accompanying drawings, wherein like reference numerals refer to like elements throughout.

In the following description and the accompanied drawings, detailed descriptions of well-known functions or configuration that may obscure the subject matter of the present disclosure will be omitted for simplicity. It is to be noted that the same components are designated by the same reference numerals throughout the drawings.

The terms and words used in the following description and drawings are not necessarily to be construed in an ordinary sense or a dictionary, and may be appropriately defined herein to be used as terms for describing the present disclosure in the best way possible. Such terms and words should be construed as meaning and concept consistent with the technical idea of the present disclosure.

The configurations of embodiments described in this specification or shown in the drawings are merely the most preferred embodiments of the present disclosure, and do not limit the technical ideas of the present disclosure. Therefore, it should be understood that there are various equivalents and modifications that may replace the configurations of the embodiments.

The terminologies including ordinals such as "first" and "second" used to explain various elements in this specification may be used to discriminate an element from the other ones or for simplicity. For example, a second component may be referred to as a first component, and similarly, a first component may also be referred to as a second component without departing from the scope of the present disclosure.

When an element is referred to as being "connected" or "coupled" to another element, it means that it is logically or physically connected or it may be connected to the other element. In other words, it is to be understood that although an element may be directly connected or coupled to another element, there may be other elements therebetween, or element may be indirectly connected or coupled to the other element.

The terminology used herein is for the purpose of describing particular embodiments only and is not intended to be limiting of the disclosure. The singular forms include plural referents unless the context clearly dictates otherwise. Also, The expressions "~comprises," "~includes," "~constructed," "~configured" are not to be construed as being equipped with all the components, processing steps, or operations described in this specification, but some of the components, the processing steps, or the operations may not be included and additional elements may be incorporated further.

The embodiments within the scope of the present disclosure include computer-readable media having or carrying computer executable instructions or data structures stored in computer-readable media. Such computer-readable media may be an arbitrary media that is accessible by a general purpose or special purpose computer system. The computer-readable media may include, but is not limited to, a physical storage media such as RAM, ROM, EPROM, CD-ROM, other optical disk storage, a magnetic disk storage, and other magnetic storage devices. The computer-readable media may be used to store or deliver certain program code means in the form of computer-executable instructions, computer-readable instructions, or data structures.

In the following descriptions including the claims, the term "network" is defined as one or more data links that enable exchange of electronic data between computer systems and/or modules. When information is transmitted or provided to a computer system through a network or other communication connection, the connection may be understood as a computer-readable medium. The computer readable instructions include, for example, instructions and data that cause a general purpose computer system or a specific purpose computer system to perform a particular function or group of functions. The computer executable instructions may be binary format instructions or intermediate format instructions written in, for example, the assembly language or high level languages.

The present disclosure may be practiced in a networked computing environment including at least one of various types of computing systems such as a personal computer, a laptop computer, a handheld device, a multiprocessor system, a microprocessor-based or programmable consumer electronics, a network PC, a minicomputer, a mainframe computer, a pager, and so on. Also, the present disclosure may be practiced in distributed system environment where both a local and a remote computer systems linked by wired data links, wireless data links, or a combination of wired and wireless data links over a network perform tasks. In a distributed system environment, the program modules may reside in local and remote storage devices.

Hereinbelow, described are a method of providing delivery item information according to an embodiment of the present disclosure, and a device and system for implementing the method.

First, a system for supporting the method of providing the delivery item information according to an embodiment of the present disclosure will now be described in detail.

FIG. 1 is a block diagram of the system for supporting the method of providing the delivery item information according to an embodiment of the present disclosure.

Referring to FIG. 1, the system for supporting the method of providing the delivery item information according to an embodiment of the present disclosure may include a device 100 and a service server 200. Additionally, the system of the present disclosure may further include at least one affiliated server 300 such as a server suitable for receiving moving picture data from the device 100 to store in a predetermined storage space allocated to the corresponding device 100 and a shipping system server that may be linked to the service server 200.

The device 100 refers to a user device suitable for transmitting and receiving various data through a communications network 400 in response to an operation of the user. The device 100 may perform voice or data communications through the communications network 400 and may exchange various information with the service server 200. The device 100 may include a browser for transmitting and receiving information, a memory for storing programs and protocols, and a microprocessor for executing programs for calculation and control purposes.

In particular, the device 100 according to the present embodiment may execute an application program which may communicate with the service server 200. When a camera mounted in the device 100 is activated by the application program, the device 100 may photograph an identification code attached on a delivery item package through the activated camera. Here, the delivery item refers to an item having been shipped by a seller, for example, and is being delivered by courier or mail, and is generally in a condition where it is difficult to check the contents through a box or plastic package. According to the present disclosure, the identification code is attached on the delivery item package so as to allow checking information about the delivery item before the packaging is removed. The device 100 may photograph and recognize the identification code attached on the delivery item package, and request moving picture data corresponding to the identification code from the service server 200.

The identification code may be a simple one-dimensional barcode, a two-dimensional barcode such as a QR code, a color bar code, or any other variant of them. In the present disclosure, it is assumed that the identification code has a form of the QR code or the other kind of the two-dimensional barcode. The QR code is a type of matrix barcode consisting of back squares arranged in a square grid on a white background, and may store up to 7,089 numeric characters, 4,296 alphanumeric characters, or 1,817 Kanji characters. Because of the large amount of data that can be stored, the QR code has an advantage of being able to store Internet universal resource locator (URL), still image and moving picture, map, and business card information, and is widely being used as an advertisement or marketing tool in addition to a traditional usage of product identification in a store or a factory. According to the present disclosure, moving picture data is not stored in the two-dimensional barcode but is maintained in the service server 200, and the two-dimensional barcode carries the Internet URL for accessing the moving picture data in the service server 200, so that the device 100 having photographed and recognized the identification code may access the moving picture data.

The moving picture data corresponding to the identification code may contain information about the delivery item. For example, the moving picture data may include a instruction manual of the delivery item or another information related to the delivery item such as how to assemble the item. Also, the moving picture data may include an advertisement of the delivery item, a corporate advertisement of the manufacturer of the delivery item, or other kinds of marketing information. Further, the moving picture data may include a message from a user who ordered the delivery item.

When receiving the moving picture data from the service server 200, the device 100 may superimpose a moving picture corresponding to received moving picture data on an image photographed by the activated camera. In other words, the device 100 according to the present disclosure outputs the moving picture corresponding to the identification code in an augmented reality form which combines the moving picture with the real image being photographed by the camera, so that a user may see the moving picture corresponding to the identification code lively and check the item in the delivered package realistically. When the moving picture is output in the augmented reality, the moving picture may be changed according to a movement and orientation of the device 100 to enhance liveliness of the augmented reality.

The operation of the device 100 will be described below in detail. The device 100 according to embodiments of the present disclosure may be implemented in various forms. For example, the device 100 may be a mobile device such as a smartphone, a tablet PC, a personal digital assistant (PDA), a portable multimedia player (PMP), or a fixed device such as a smart TV and a desktop computer.

Even though it is impossible to enumerate all types of devices in consideration of convergence trend of digital devices, any device unit equivalent to the device units mentioned above may be used as the device 100. Also, any device unit capable of communicating with the service server 200 and the affiliated server 300 through the communications network 400 may be used as the device 300 according to the present disclosure.

Although just a single device 100 is shown in FIG. 1, there may be a plurality of the devices 100, in the system, that communicate with the service server 200. Also, the user who ordered the delivery item may be different from the user who received the delivery item. Hereinbelow, the embodiments of the present disclosure will be described in terms of the device 100 of a receiver who receives the delivery item for convenience of description. If it is necessary to discriminate the devices of an orderer and the receiver, the terms "orderer device" and "receiver device" will be used. Even in such a case, however, the orderer device may be the same device as the receiver device from a hardware point of view.

The service server 200 supports a service of providing the delivery item information according to an embodiment of the present disclosure. Specifically, the service server 200 may generate, store, and maintain the moving picture data corresponding to the identification code. In particular, in case that the moving picture data is a user-designated message produced by the user, the service server 200 may provide various services to the device (e.g. the orderer device) to allow the user to produce or generate the corresponding moving picture data. In addition, the identification code of the present disclosure may be printed in a form of a waybill so as to be attached on the package to be delivered by the courier or the mail.

The service server 200 may generate the identification code and transmit the identification code to the affiliated server 300, so that the operator of the affiliated server 300 may print the identification code and attach on the package. However, the service server 200 may print the identification code, by itself, to be attached on the package, and transmit the identification code to the device 100.

In the case that the moving picture data is the advertisement of the corresponding delivery item, the service server 200 may identify the user who watched the advertisement and control the process so that a compensation is provided to the user. Also, the service server 200 may support a process of creating, producing, and distributing the application program for performing the operations described above.

The service server 200 may be an online shopping mall server, or may be a separate server that is interfaced with the online shopping mall server and performs the operations described above.

The configurations and operations of the device 100 and the service server 200 will be described below in detail. A processor mounted in each device according to an embodiment of the present disclosure may execute program instructions for performing the method according to the present disclosure. The processor may be a single-threaded processor. Alternatively, however, the processor may be a multi-threaded processor. The program instructions executed by the processor may be stored on a memory or storage device.

The device 100, the service server 200, and the affiliated server 300 according to an embodiment of the present disclosure exchange various information through the communications network 400. The communications network 400 may be a wireless network adopting a wireless communication scheme such as wireless local area network (WLAN), Wi-Fi, wireless broadband Internet (Wibro), Worldwide Interoperability for Microwave Access (WiMAX), and High Speed Downlink Packet Access (HSDPA). However, the present disclosure is not limited thereto, but the communications network 400 may be a wired network adopting a communication scheme such as Ethernet, Digital Subscriber Line (xDSL) such as Asymmetric Digital Subscriber Line (ADSL) and Very High Bitrate Digital Subscriber Line (VDSL), Hybrid Fiber Coaxial Cable (HFC), Fiber-to-the-Curb (FTTC), and fiber-to-the-home (FTTH).

Also, the communications network 400 includes a plurality of access networks (not shown) and a core network (not shown), and may further include an external network such as Internet (not shown). The access network (not shown), which allows the device 100 to connected to the core network, may include a plurality of base stations such as a traditional base station (BS), a base transceiver station (BTS), a Node B (or NodeB), an Evolved Node B (eNodeB), and a plurality of base stations such as a traditional Base Station Controller (BSC) or a Radio Network Controller (RNC). Meanwhile, a digital signal processing unit and a radio signal processing unit integrally implemented in the base station may be divided into a digital unit (as DU) and a radio unit (RU), so that each of a plurality of RUs are provided in respective one of a plurality of areas, and the plurality of RUs) are connected to a centralized DU.

The core network, which performs main functions for mobile communication services such as mobility control and switching among the access networks, performs circuit switching or packet switching operations and manages and controls packet flow in the communications network 400. Also, the core network allows inter-frequency mobility and may play a role for interworking traffics in the access network and the core network with another network such as Internet. The core network may further include at least one of: a Serving Gateway (SGW), a Packet Data Network (PDN) Gateway, a Mobile Switching Center (MSC), a Home Location Register (HLR), a Mobile Management (MME), and a Home Subscriber Server (HSS).

The Internet (not shown), which refers to a public network that allows information exchange according to a TCP/IP protocol, is connected to the service server 200 and may provide information provided by the service server 200 to the device 100 via the core network and the access network and provide information from the device 100 to the service server 200 via the core network and the access network.

Now, described is an overall process of providing the delivery item information according to an embodiment of the present disclosure.

Figure 2:
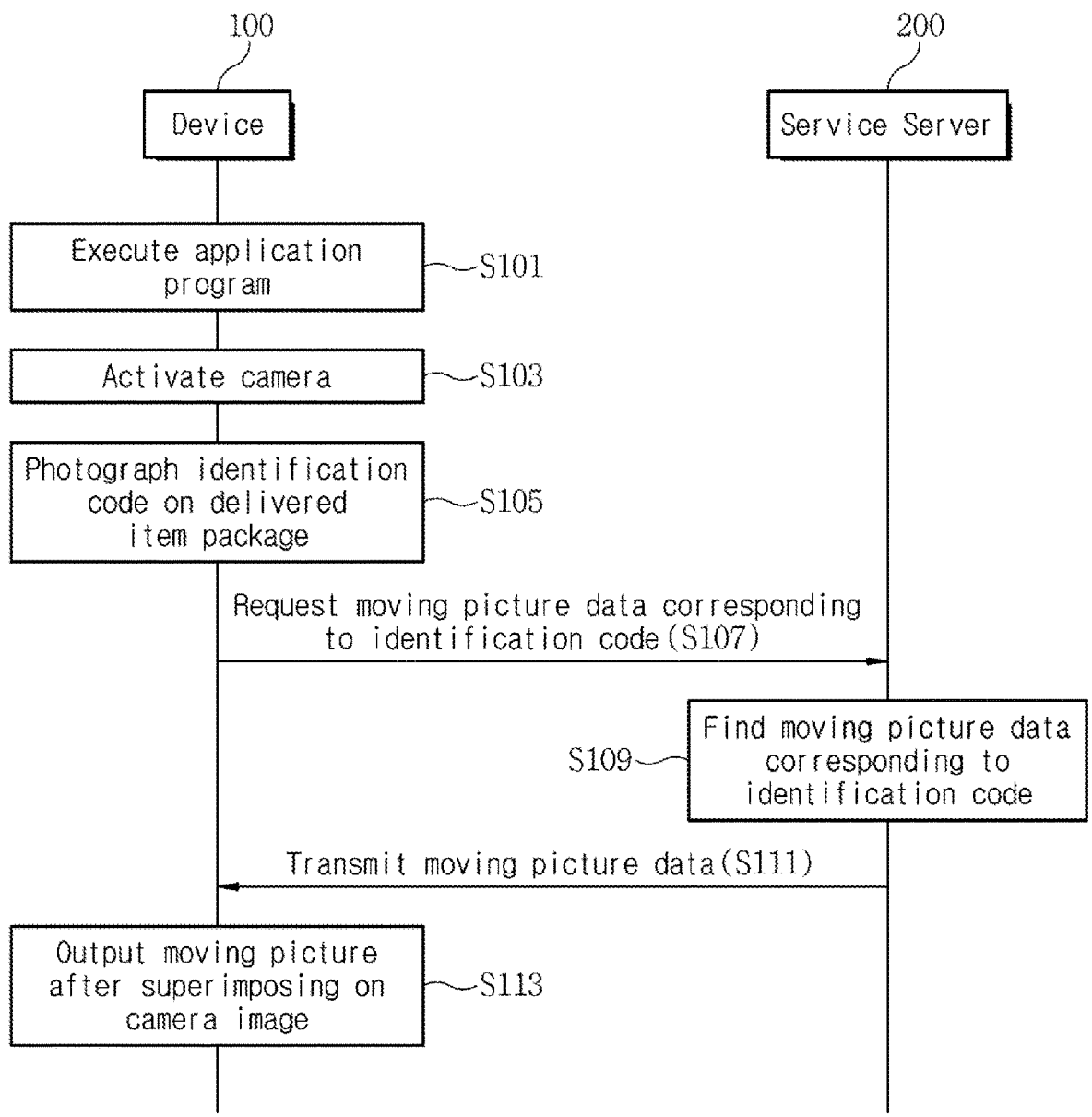
FIG. 2 is a flowchart illustrating the method of providing the delivery item information according to an embodiment of the present disclosure.

FIG. 2 is a flowchart illustrating the method of providing the delivery item information according to an embodiment of the present disclosure.

It is assumed that the user of the device 100 have received the delivery item before the procedure shown in FIG. 2 is initiated. Here, the delivery item, which refers to an item being delivered by courier or mail and of which package is unpacked yet, is generally in a condition where it is difficult to check the contents through the box or plastic package. Also, the identification code is attached on the delivery item package.

In response to an input of the user having received the delivery item, the device 100 may execute the application program installed previously (S101). While the application is being executed, the camera may be activated in response to a selection input of the user (S103). Alternatively, the camera may be activated automatically at the same time as the execution of the application program according to a setting of the application program.

The user of the device 100 may place the device 100 of which camera is activated on the identification code and photograph the identification code (S105). Here, the photographing of the identification code may include a process of aligning the device 100 with the identification code so that the identification code is placed within a predetermined frame of the camera, and may include a process of pressing a photographing button of the camera. At this time, a separate guide mark may be displayed on the activated camera to facilitate positioning of the identification code within the frame of the camera, and the user may move the device 100 in such a direction that the identification code enters the frame following the guide mark.

After the identification code is photographed through this process, the device 100 may recognize the identification code. The recognition of the identification code may include an operation of detecting a URL corresponding to the identification code. Also, the recognition of the identification code may include an operation of recognizing the service server 200 maintaining the identification code. The recognition of the identification code may include another operation required for requesting the moving picture data from the service server 200.

After the identification code is recognized, the device 100 may request the moving picture data corresponding to the identification code from the service server 200 (S107). At this time, the device 100 may transmit the URL of the moving picture data extracted from the identification code to the service server 200, or may transmit the recognized identification code to the service server 200 in an image form.

The service server 200, which maintains the identification code and the moving picture data and stores the moving picture data corresponding to the identification code in advance, finds the moving picture data corresponding to the identification code in response to the request of the device 100 (S109) and transmit the moving picture data found in the operation S109 to the device 100 (S111).

The service server 200 of the present disclosure may download a file of the moving picture data to the device 100 as a whole. Alternatively, the service server 200 may transmit the moving picture data to the device 100 in streaming fashion.

The device 100 waits for a response from the service server 200 in a state that the device continues to execute the application program and the camera is activated. Upon receiving the moving picture data from the service server 200, the device 100 may superimpose the moving picture corresponding to received moving picture data on an image being photographed by the camera to output the moving picture in an augmented reality form (S113).

The moving picture data received from the service server 200 may include at least one of: advertisement information related with the delivery item such as the advertisement of the delivery item, the corporate advertisement of the manufacturer of the delivery item, and an advertisement of a related product; detailed information of the delivery item such as the instruction manual of the delivery item, specifications of the delivery item, and order details; and information designated by the orderer such as a message card of the orderer.

Thus, according to the present disclosure, the user of the device 100 may easily check the information about the delivery item, without unpacking the package, through the moving picture reproduced after the recognition of the identification code. Also, the user may view the instruction manual of the delivery item intuitively through the moving picture, and may receive a lively message from the gift provider in the case that the delivery item is a gift.

The method of providing the delivery item information according to an embodiment of the present disclosure will be described in more detail.

Figure 3:
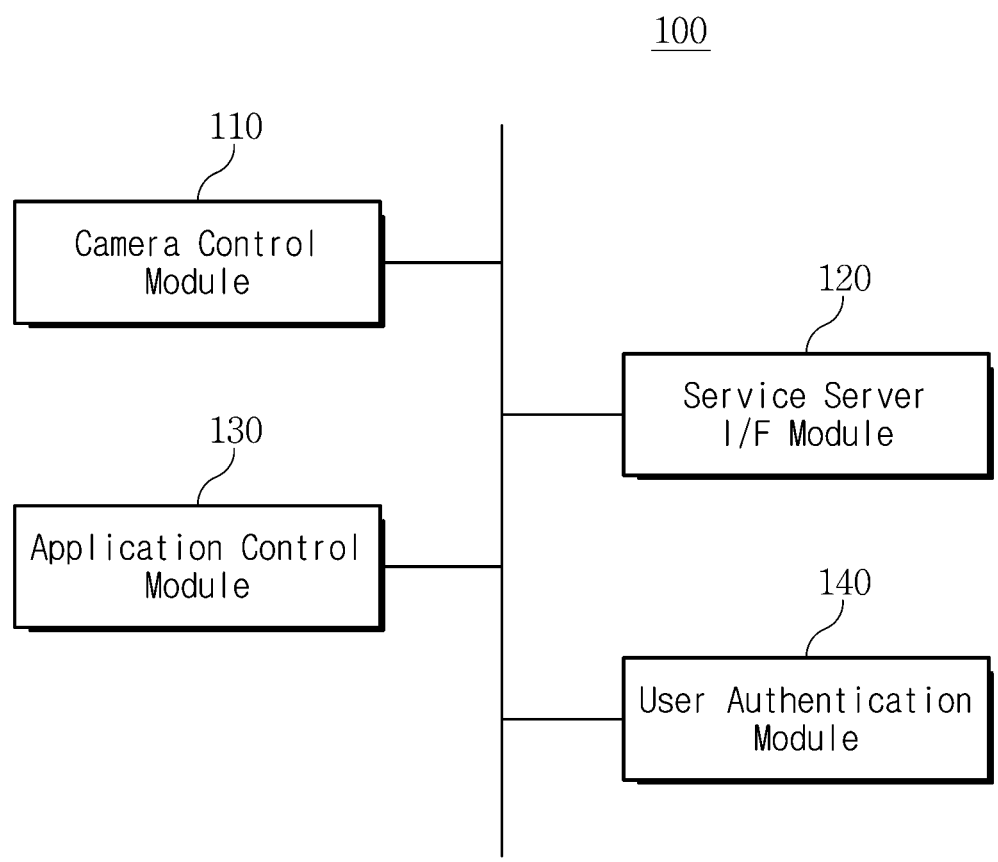
FIG. 3 is a block diagram of a device according to an embodiment of the present disclosure.

FIG. 3 is a block diagram of the device 100 according to an embodiment of the present disclosure.

Referring to FIG. 3, the device 100 may include a camera control module 110, a service server interface module 120, an application control module 130, and a user authentication module 140.

Here, the term "module" is used herein to refer to an entity performing respective operation and being implemented by hardware, software, or a combination thereof. For example, the "module" may be a program module executed by a processor to carry out a predetermined function, and may include one or more components such as software components, object-oriented software components, class components, and task components, and may include processes, functions, attributes, procedures, subroutines, segments of program code, drivers, firmware, micro codes, circuits, data, a database, data structures, tables, arrays, or variables. Also, a function provided by the a component and a "module" may be implemented by a combination of smaller components and "modules" or may be divided into additional components and "modules."

The camera control module 110 may activate the camera under a control of the application control module 130. Also, the camera control module 110 may provide the guide mark on a real-time camera image displayed on the device 100 to facilitate positioning of the identification code within the frame of the camera. If the identification code is positioned inside the frame of the camera, the camera control module 110 may recognize the identification code. The camera control module 110 may extract the identification code itself or another information (e.g. the URL) for use in accessing the moving picture data corresponding to the identification code, and may transfer the extracted information to the application control module 130.

The camera control module 110 may control the operation of superimposing the moving picture from the service server 200 on the real-time camera image displayed on the device 100 under the control of the application control module 130. At this time, the camera control module 110 may search a marker in the identification code in the real-time camera image and transmit position information of the marker to the application control module 130, and then control the operation of superimposing the moving picture on the real-time camera image under the control of the application control module 130. If the user fails to align the device 100 with the identification code and thus the marker in the identification code is not recognized in the real-time camera image, the camera control module 110 may inform the user that an alignment is required. Further, the camera control module 110 may perform another operations required to superimpose the moving picture on the real-time camera image.

In addition, the camera control module 110 may control an image processing operation, under the control of the application control module 130, such that the moving picture is rotated, translated, or modified according to the position and orientation of the marker in the identification code.

Meanwhile, the camera control module 110 may detect, under the control of the application control module 130, whether there is a designated area in the moving picture that is output in combination with the real-time camera image. If there is the designated area, the camera control module 110 may superimpose prescribed data on the designated area under the control of the application control module 130.

The camera control module 110 may control the camera installed in the device 100. Here, the device 100 may be configured to include a front camera and a rear camera. The camera control module 110 may control the operation of photographing and recognizing the identification code through the rear camera, and may perform an operation of recognizing the face of the user through the front camera.

The service server interface module 120 performs a process of interfacing with the service server 200. In particular, the service server interface module 120 may transmit a request for the moving picture data corresponding to the identification code recognized by the camera control module 110, and receive the moving picture data from the service server 200 to transfer to the application control module 130.

Besides, the service server interface module 120 may transmit and receive various information to and from the service server 200 through the communications network 400.

The application control module 130 performs overall control over the process of providing delivery item information according to the embodiment of the present disclosure. The application control module 130 controls the execution of the application program according to the manipulation of the user. While the application program is being executed, the application control module 130 may control various operations performed by the application program. In particular, the application control module 130 may control the camera control module 110 to activate the camera and recognize the identification code attached on the delivery item package.

Upon receiving the identification code from the camera control module 110, the application control module 130 may transmit the request for the moving picture data corresponding to the identification code to the service server 200 through the service server interface module 120. When the moving picture data corresponding to the identification code is received from the service server 200 through the service server interface module 120, the application control module 130 may transfer the moving picture data to the camera control module 110 and the camera control module 110 to superimpose the moving picture on the real-time camera image.

The application control module 130 may support a process of uploading the moving picture data received from the service server 200 to the affiliated server 400 specified by the user in advance. For example, the application control module 130 may support a process of uploading the moving picture data to a personal media service server such as a social network service (SNS) server in which the user is subscribed.

Also, the application control module 130 may receive, from the service server 200, a list of moving pictures corresponding to the identification information and output a moving picture list to invite the user to choose a certain moving picture. Additionally, the application control module 130 may send user identification information extracted by the user authentication module 140 to the service server 200, or may support a process of checking whether the user is an authorized user before the moving picture is output by the camera control module 110. These operation of the application control module 130 will be described below in more detail.

The user authentication module 140 may perform an operation of acquiring the user identification information. The user identification information is information suitable for use in discriminating a user from the other users, and may include at least one of a phone number assigned to the device, facial identification information recognized through the front camera, and biometric information recognized through a biometric module. However, the present disclosure is not limited thereto, and the user identification information may be any other information that can be used to identify the user.

A user verification process may be performed by the device 100 or by the service server 200. In case that the user verification process is performed by the device 100, the user authentication module 140 may extract the user identification information from the identification code and determine whether the user is an authorized user by comparing the user identification information extracted from the identification code with identification information of the user of the device 100. Meanwhile, in case that the user verification process is performed by the service server 200, the user authentication module 140 may transmit the user identification information of the user to the service server 200 so that the service server 200 carries out the user verification process.

The method of providing the delivery item information in the device 100 according to embodiments of the present disclosure will be described in more detail with reference to attached drawings.

Figure 4:
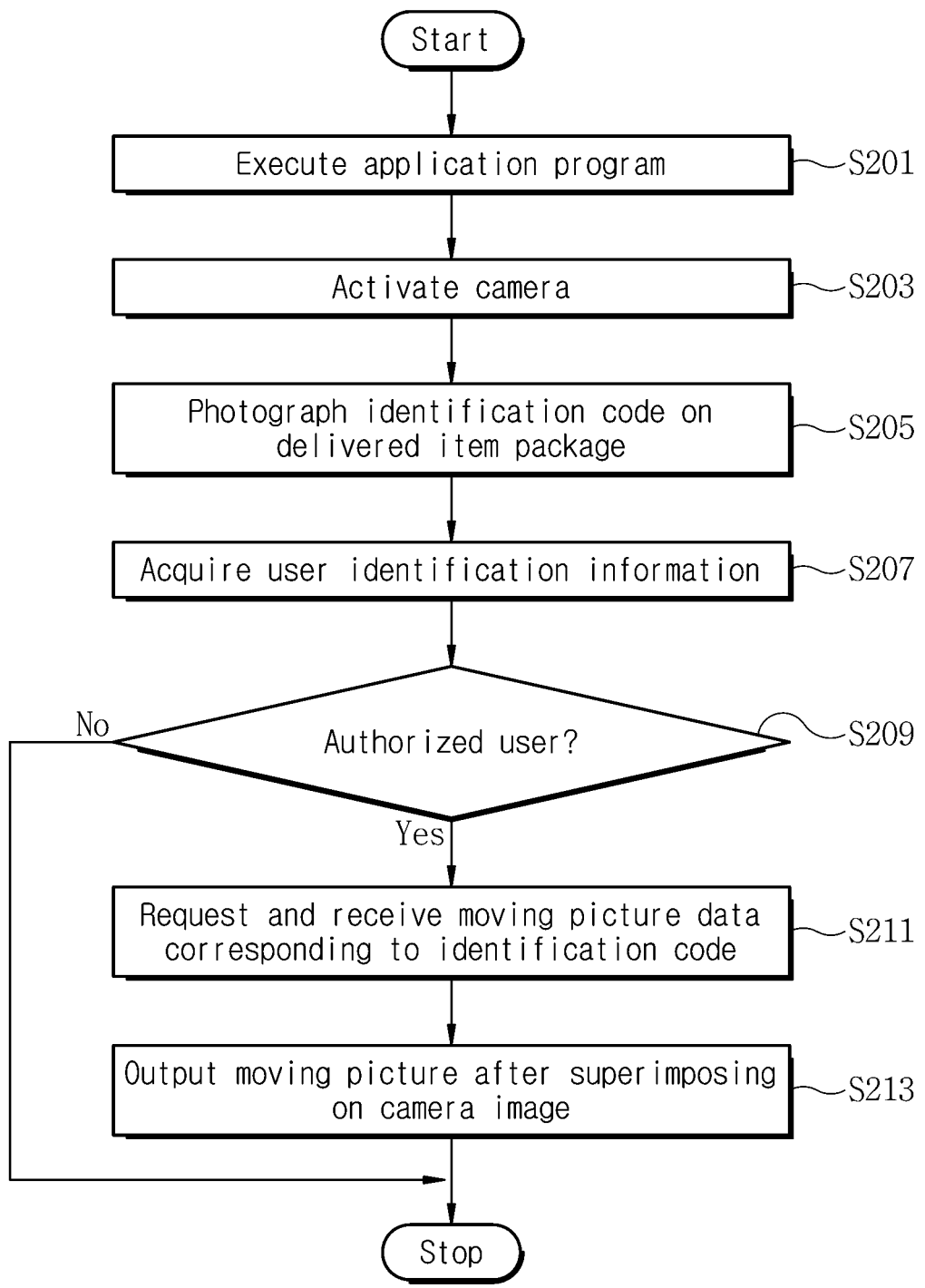
FIG. 4 is a flowchart illustrating a method of providing the delivery item information in the device according to an embodiment of the present disclosure.

FIG. 4 is a flowchart illustrating a method of providing the delivery item information in the device according to an embodiment of the present disclosure.

It is assumed that the user of the device 100 have received the delivery item by courier or mail before the procedure shown in FIG. 4 is initiated. In order that the user may check the contents without unpacking the package, the device 100 may execute the application program in response to an input of the user (S201)

While the application is being executed, the camera may be activated in response to a selection input of the user (S203). Alternatively, the camera may be activated automatically at the same time as the execution of the application program according to a setting of the application program.

The user of the device 100 may place the device 100 of which camera is activated on the identification code and photograph the identification code (S205).

Subsequently, the device 100 may extract the user identification information from the identification code (S207), and determine whether the user is an authorized user by comparing the user identification information extracted from the identification code with the identification information of the user (S209).

For example, in case that the user identification information extracted from the identification code is the phone number, the device 100 may compare the phone number assigned to the device 100 with the user identification information. In case that the user identification information extracted from the identification code is the facial recognition information, the device 100 may recognize facial information of the user from a picture photographed by the front camera and compare the facial recognition information acquired through the front camera with the facial recognition information extracted from the user identification information. In case that the user identification information extracted from the identification code is the biometric information such as a fingerprint, the device 100 may activate a biometric module of the device to receive biometric information of the user and compare the acquired biometric information with the biometric information in the user identification information.

If it is determined in the above process that the user is an authorized user, the device 100 may request the moving picture data corresponding to the identification code from the service server 200 and receive the moving picture data from the service server 200 (S211).

Here, the device 100 may check whether the user is an authorized user after receiving the moving picture data corresponding to the identification code from service server 200 depending on the implementations.

Afterwards, the device 100 may superimpose the moving picture data on the real-time camera image to output the moving picture in the augmented reality form (S213).

At this time, the device 100 may track the marker in the identification code to carry out operations of rotating, translating, or modifying the moving picture according to the position, orientation, and movement of the marker Such an operation will be described with reference to FIG. 5.

Figure 5:
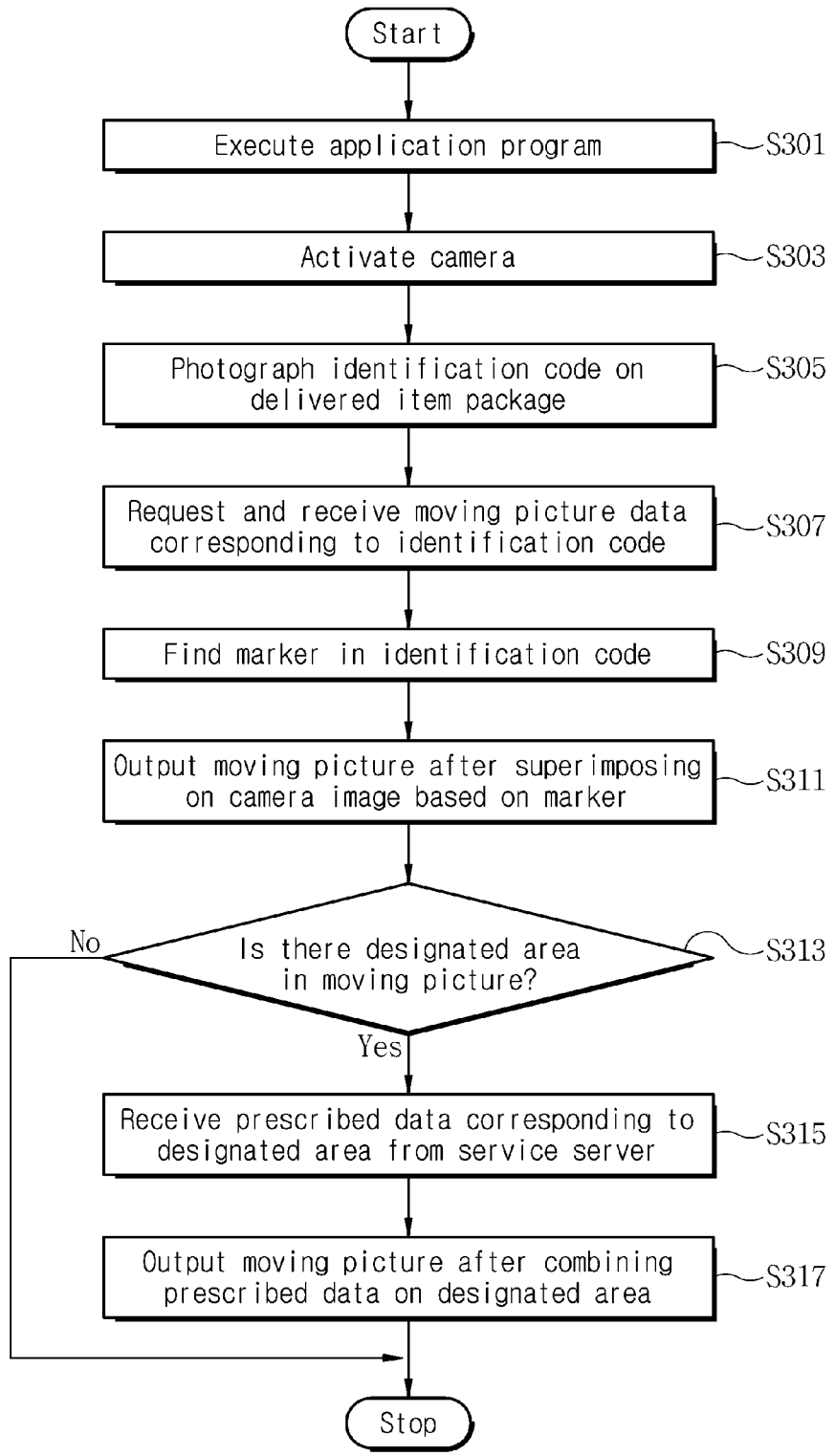
FIG. 5 is a flowchart illustrating the method of providing the delivery item information in the device according to another embodiment of the present disclosure.

FIG. 5 is a flowchart illustrating the method of providing the delivery item information in the device according to another embodiment of the present disclosure.

Since the operations S301 through S305 in FIG. 5 are the same as the operations from S201 through S205 in FIG. 4, detailed descriptions thereof will be omitted for simplicity. After photographing and recognizing the identification code, the device 100 may request the moving picture data corresponding to the identification code from the service server 200 to receive the moving picture data (S307). Here, the device 100 may transmit the user identification information rather than the identification code to receive more customized moving picture data chosen in consideration of the user identification information among a plurality of moving picture data corresponding to the identification code.

Meanwhile, the device 100 continuously remains in a state that the camera is activated and is photographing the identification code. In such a state, the device 100 having received the moving picture data from the service server 200 may recognize the identification code in the real-time camera image and then search and track the marker in the identification code (S309). After the marker is found and being searched, the device 100 may output the moving picture corresponding to the moving picture data by superimposing the moving picture on the real-time camera image based on the marker (S311). At this time, the device 100 may perform a transformation of the moving picture depending on the position and orientation of the marker while continuously tracking the position and orientation of the marker. For example, if there are four square-shaped markers, the device 100 may control the output operation by setting a playback frame enlarged by a certain scale which is determined based on the markers and playing back the moving picture in the playback frame. The device 100 may continuously track the markers, and performs the transformation of the moving picture such as the rotation, translation, or scaling so that the moving picture can certainly be played back within the playback frame. In another example, when a plurality of markers are extracted from the identification code, the device 100 may receive a plurality of moving pictures which correspond to respective markers and output the plurality of moving pictures in correspondence with the positions of the respective markers.

The marker-based augmented reality technology that tracks the marker combines objects based on image recognition technology is well known in the art, and a detailed description thereof will be omitted. It should be noted that the non-marker-based augmented reality technique may be applicable in another embodiment of the present disclosure.

Meanwhile, while the moving picture is output being superimposed on the real-time camera image, the device 100 may continuously check whether there is a designated area in the moving picture (S313).

For example, when the device 100 outputs the moving picture data in the augmented reality form, the device 100 may analyze frame by frame whether a specific object, e.g. a human object, exists in the moving picture being played back. In case that there exists a human object in the moving picture, the device 100 may check, with a support of the service server 200, whether there is a designated area (e.g., hand, face, eye, and so on) and whether there is prescribed data corresponding to the designated area.

If there is a designated area and there is prescribed data corresponding to the designated area, the device 100 may receive the prescribed data from the service server 200 (S315), and combine the prescribed data in the designated area of the moving picture which is being superimposed on the real-time camera image to output the combined image (S317).

Such a feature may be applicable in following embodiments. In an example in which the designated area is the mouth of the human object and the prescribed data is greetings, the device 100 may track the mouth of the human object and combine the greetings on the mouth area of the moving picture. In another example in which the designated area is the palm of the human object and the prescribed data is product image information, the device 100 may track the palm of the human object and combine the product image on the palm area of the moving picture.

As described above, the method of providing the delivery item information according to the present embodiment may further combine additional information on a specific area of the moving picture when the moving picture is superimposed on the real-time camera image, thereby providing the user with more lively and exotic information related with the delivery item.

Figure 6:
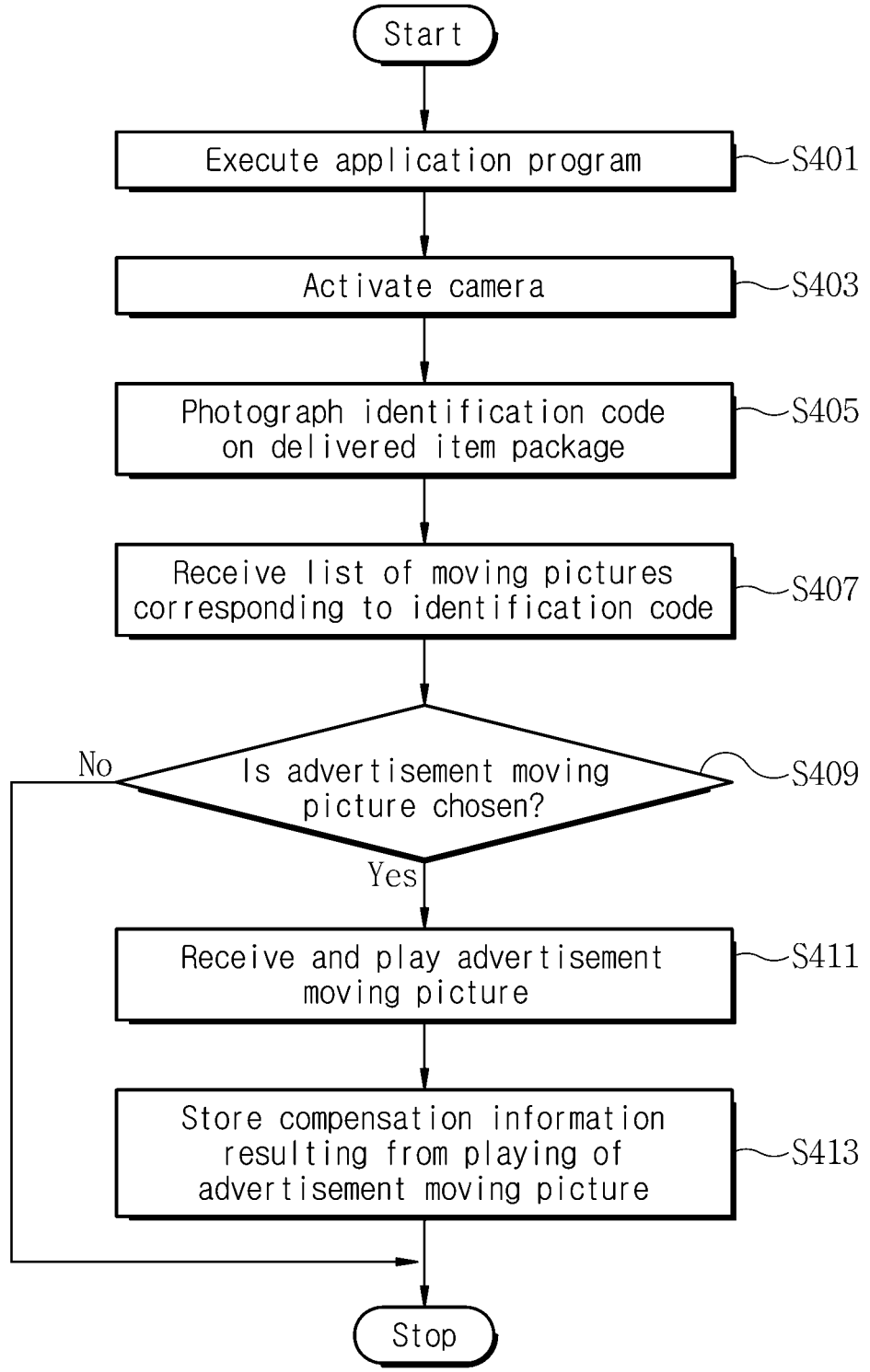
FIG. 6 is a flowchart illustrating the method of providing the delivery item information in the device according to yet another embodiment of the present disclosure.

When security information is set in the prescribed data, the device 100 may output the prescribed data only to an authorized user after performing the user verification process such as inputting a password, FIG. 6 is a flowchart illustrating the method of providing the delivery item information in the device according to yet another embodiment of the present disclosure.

The operations S501 through S505 in FIG. 6 are the same as the operations from S201 through S205 in FIG. 4, detailed descriptions thereof will be omitted for simplicity. After photographing and recognizing the identification code, the device 100 may request the moving picture data corresponding to the identification code. At this time, when there are a plurality of moving pictures corresponding to the identification code, the service server 200 may choose one of the plurality of moving pictures according to the user identification information of the device 100 and transmit the moving picture data corresponding to the chosen moving picture to the device 100. Alternatively, the service server 200 may transmit a moving picture list to the device 100, so that the user may choose one moving picture in the list. When composing the moving picture list, the service server 200 may compose an appropriate list according to the user identification information of the device 100.

Upon receiving the moving picture list corresponding to the identification code from the service server 200, the device 100 may output the moving picture list by combining the moving picture list with the real-time camera image. When the device 100 receives a user input choosing an advertisement moving picture in the moving picture list (S409), the device 100 may request the advertisement moving picture data from the service server 200 and receive the moving picture data to output the advertisement moving picture by superimposing on the real-time camera image (S411). Subsequently, the device 100 may store compensation information resulting from playing of the advertisement moving picture and transmit the compensation information to the service server 200 so that the service server 200 may accumulate points corresponding to the compensation information. Later, the user of the device 100 may use the accumulated points to purchase other goods or services.

The configuration and operation of the device 100 according to an embodiment of the present disclosure have been described above. Now, the configuration and operation of the service server 200 according to an embodiment of the present disclosure will be described in detail.

Figure 7:
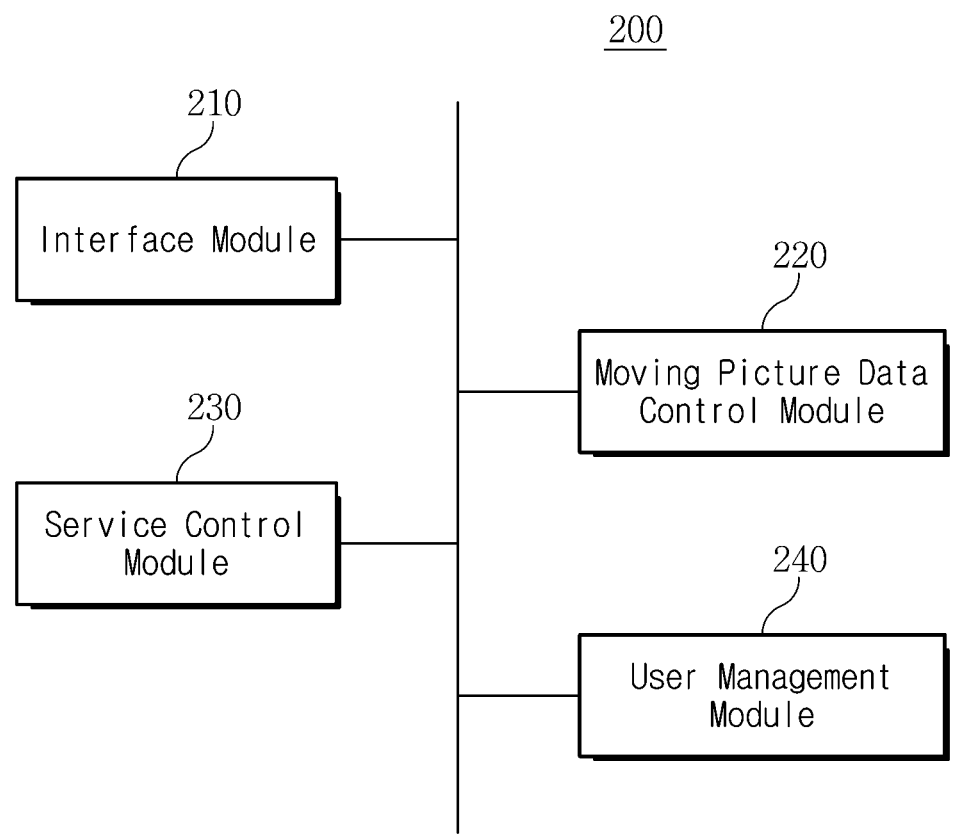
FIG. 7 is a block diagram of a service server according to an embodiment of the present disclosure.

FIG. 7 is a block diagram of a service server according to an embodiment of the present disclosure.

Referring to FIG. 7, the service server 200 may include an interface module 210, a moving picture data control module 220, a service control module 220, a user management module 240.

The interface module 210 transmits and receives information to and from the device 100 and the affiliated server 300 under a control of the service control module 220. For example, the interface module 210 may receive the request for moving picture data corresponding to the identification code from the device 100 to transfer to the service control module 220 and transmit, to the device 100, the moving picture data transferred from the service control module 220. Also, the interface module 210 may support an operation of uploading the moving picture data, in response to a request of the device 100, to the affiliated server 300 designated in the request. Further, the interface module 210 may be interfaced with the affiliated server 300 of a carrier, for example, to exchange information necessary for performing the method of providing the delivery item information.

The moving picture data control module 220 is in charge of generating and maintaining of the moving picture data corresponding to the identification code to be attached on the delivery item package. Here, the moving picture data refers to data representing the moving picture associated with the delivery item. For example, the moving picture data may include at least one of: the detailed information of the delivery item such as the instruction manual, the specification, and order details; and the advertisement information related with the delivery item such as the advertisement of the delivery item, the corporate advertisement of the manufacturer, and the advertisement of the related product. In such a case, the moving picture data may be generated by the manufacturer of the delivery item, and the moving picture data control module 220 may receive the moving picture data and matching each of the moving picture data with the identification code. Meanwhile, the moving picture data may be a congratulatory message generated by the user. In such a case, the moving picture data control module 220 may provide a supporting service for generating and registering the moving picture data to the device 100 of the orderer. For example, the moving picture data control module 220 may provide the orderer device with a page for generating the moving picture, which page may support various additional functions such as adding a sticker or a speech bubble that are applicable when orderer generates the moving picture data. The moving picture data generated in the orderer device may be stored in the service server 200 to be transmitted to the receiver device later.

The service control module 220 performs overall control of the service server 200 according to an embodiment of the present disclosure. For example, the service control module 220 may generate and maintain the identification code. Here, the identification code may be generated for each delivery item. Alternatively, the identification code may be generated according to the type of delivery item, recipient, or another criteria. The service control module 220 may transmit the generated identification code to the affiliated server 300 of a carrier system, so that the carrier outputs the identification code to attach on the delivery item package instead of the waybill and delivers the delivery item package to the receiver by courier or mail.

The identification code may be the simple one-dimensional barcode, the two-dimensional barcode such as the QR code, the color bar code, or any other variant of them. The identification code may contain information for accessing the service server 200, information for identifying and accessing the corresponding moving picture data, or information for identifying the recipient. The receiver of the delivery item may be identified by recognizing the identification code.

The service control module 220 may store and maintain the moving picture data generated correspondingly with the identification code by the moving picture data control module 220. When the request for the moving picture data is received from the device 100, the service control module 220 may retrieve the moving picture data and transmit the retrieved moving picture data to the device 100.

At this time, the service control module 220 may check the user identification information of the device 100 to choose one of the plurality of moving pictures according to the user identification information of the device 100 and transmit the moving picture data corresponding to the chosen moving picture to the device 100. Alternatively, the service control module 220 may compose a moving picture list according to the user identification information and transmit the list to the device 100 so that the user may choose one moving picture in the list.

The user management module 240 may manage information about the users. The "users" used herein may include all the users who use the service of proving delivery item information according to the embodiment of the present disclosure.

For example, in case that the user refers to a carrier who performs or controls the process of delivering the delivery item to a receiver by courier or mail in connection with the service server 200, the user management module 240 may store and maintain the information of the carrier. In case that the user refers to a individual user who subscribed to the service server 200 and wants to send a gift to a third party and use the information providing method of the present disclosure, the user management module 240 may store and maintain subscription information and device information of the user.

In case that the user refers to a user of the device owned by the receiver of the delivery item, the user management module 240 may store and maintain the user identification information matched with the identification code. Here, the user of the receiver device may or may not be subscribed to the service server 200. If the user of the receiver device is subscribed to the service server 200, the service server 200 may support the service control module 230 to provide the user with customized moving picture data by using subscription information of the user. If, however, the user of the receiver device is not subscribed to the service server 200, the service server 200 may support the service control module 230 to provide the user with appropriate moving picture data according to basic user details such as name, address, and telephone number.

The detailed operation of the service server 200 according to an embodiment of the present disclosure will become more apparent from flowcharts described below.

Figure 8:
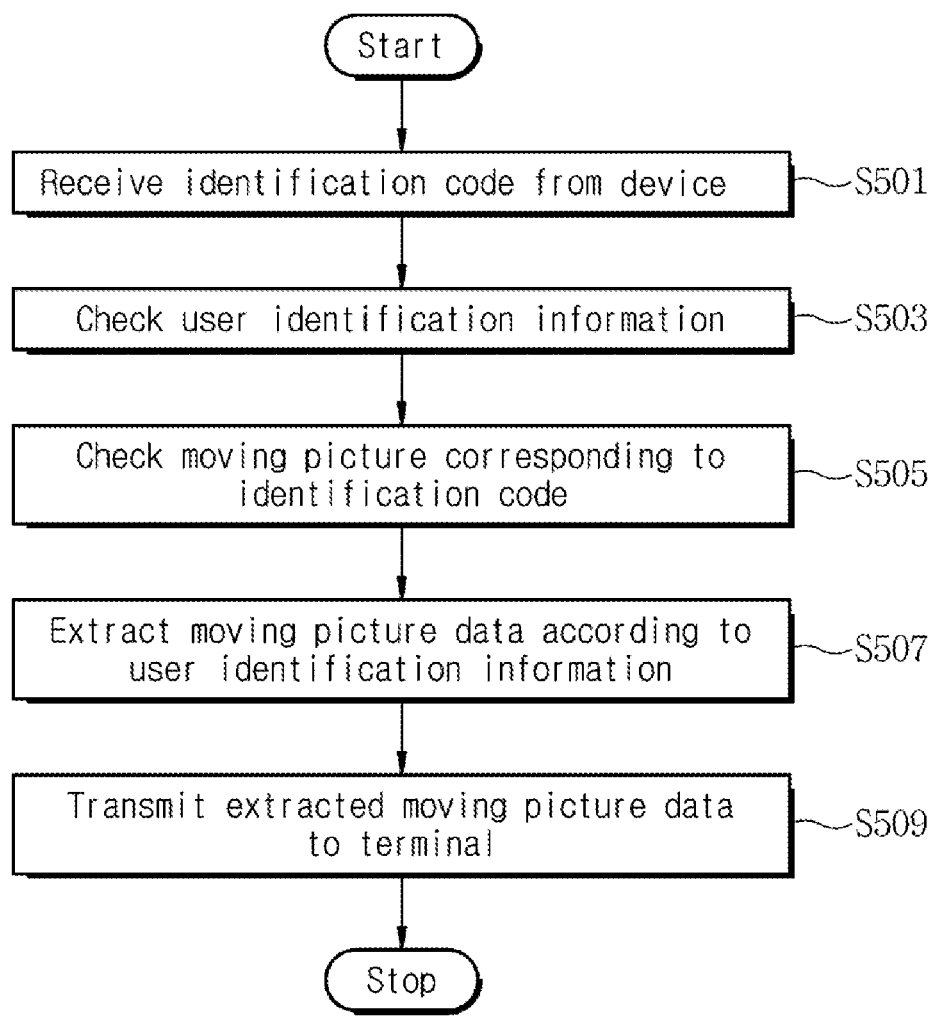
FIG. 8 is a flowchart illustrating a method of providing the delivery item information in the service server according to an embodiment of the present disclosure.

FIG. 8 is a flowchart illustrating a method of providing the delivery item information in the service server according to an embodiment of the present disclosure.

The service server 200 may receive the identification code recognized by the device 100 which photographed and recognized the identification code through the activated camera as described above (S501). The service server 200 may check the moving picture corresponding to the identification code and transmit the moving picture data to the device 100. Depending on the implementations, however, the service server 200 may check the user identification information of the device 100 (S503), and extract a moving picture among a plurality of moving pictures corresponding to the identification code in accordance with the user identification information (S505, S507) to transmit the moving picture data of the extracted moving picture to the device 100 (S509).

Here, the user identification information may be received from the device 100. Meanwhile, in case that the user identification information is stored in advance in the service server 200 being matched to the identification code, the service server 200 may check the user identification information by using the identification code received from the device 100.

On the other hand, the service server 200 may provide different moving picture data to the device 100 depending on the user identification information received from the device 100 even when the same identification code is contained in the request for the moving picture data. For example, in case that the user of the device 100 is a delivery man, the service server 200 may provide the device 100 with delivery details information. in case that the user of the device 100 is a legitimate receiver of the delivery item, the service server 200 may provide the device 100 with the moving picture data matched with identification code. In case that the user of the device 100 is a third party having no relation to the receiver of the delivery item, the service server 200 may provide the device 100 with the advertisement moving picture data matched with identification code.

Meanwhile, the service server 200 may check the address information of the user registered in the delivery system based on the user identification information of the device 100, and provide the device 100 with a targeted advertisement moving picture for a store in the vicinity of the user.

Also, the service server 200 may check or assume a propensity of the user based on the user identification information of the device 100, and provide the device 100 with the moving picture that may meet the propensity of the user. For example, if the user of the device 100 is a male in this twenties, the service server 200 may provide the advertisement moving picture targeted to males in their twenties. Further, the service server 200 may provide the device 100 with an advertisement moving picture produced in an active game format or a view-only advertisement moving picture in consideration of the user propensity.

The service server 200 may perform the user verification process to provide the moving picture data only to the device 100 of an authorized user while providing a simple advertisement moving picture or a guidance message notifying that the user is unauthorized to the device 100 of the unauthorized user.

Figure 9:
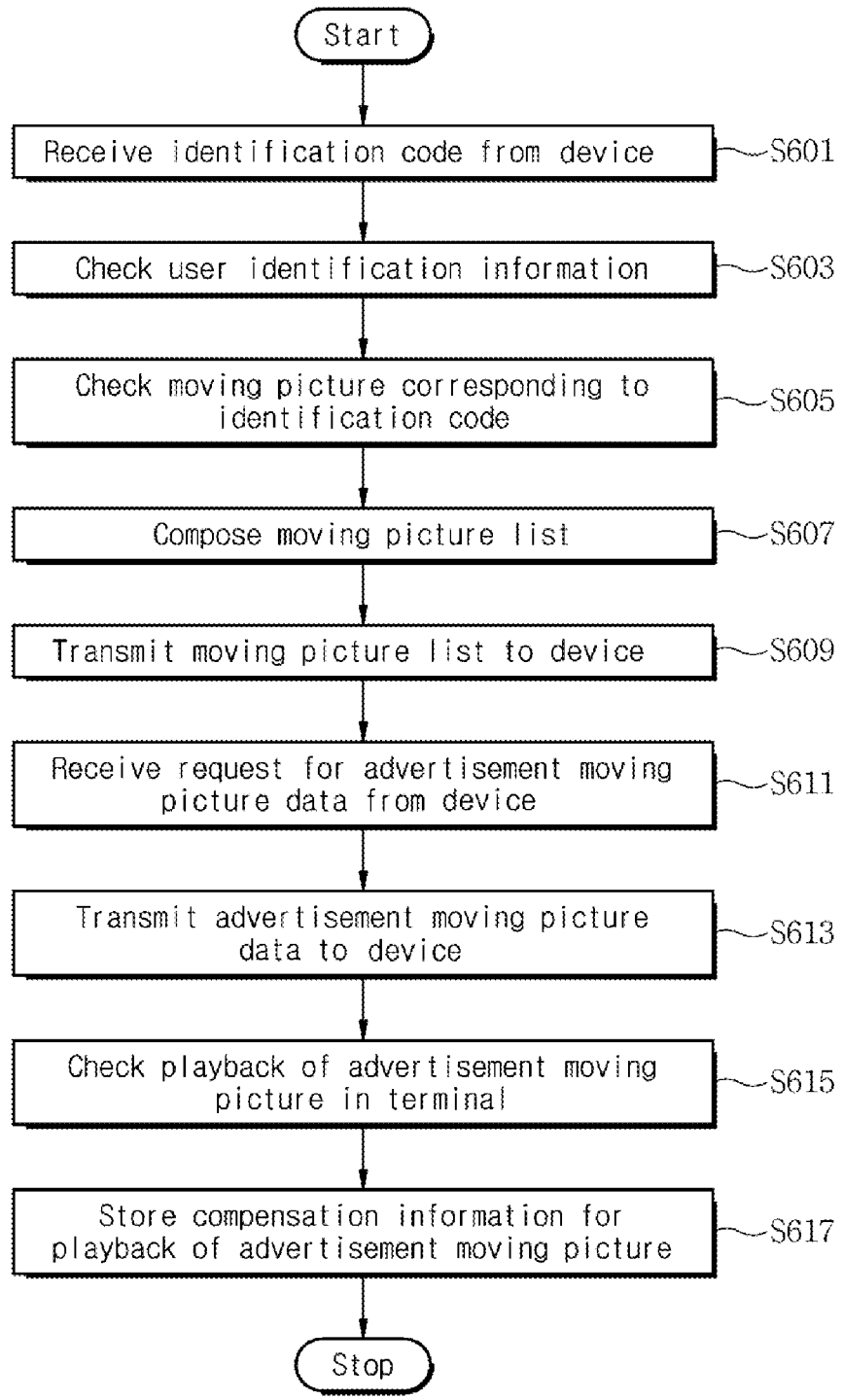
FIG. 9 is a flowchart illustrating the method of providing the delivery item information in the service server according to another embodiment of the present disclosure.

FIG. 9 is a flowchart illustrating the method of providing the delivery item information in the service server according to another embodiment of the present disclosure.

Referring to FIG. 9, the service server 200 may receive the identification code recognized by the device 100 (S601). Also, the service server 200 may check the user identification information of the device 100 (S603). The user identification information may be acquired from the device 100 or may be found by using the identification code.

Afterwards, the service server 200 may check the moving picture stored in advance in the service server 200 correspondingly to the identification code (SS605). At this time, the service server 200 can compose a moving picture list when there are a plurality of moving pictures corresponding to the identification code (S607). The service server 200 may transmit the moving picture data list to the device 100 (S609). When a request for a specific advertisement moving picture chosen from the moving picture list is received from the device 100 (S611), the service server 200 may transmit the corresponding advertisement moving picture data to the device 100 (S613) so that the device 100 may output the advertisement moving picture by superimposing on the real-time camera image.

After checking that the advertisement moving picture is completely played in the device 100 (S615), the service server 200 may accumulate the compensation information or points of the user and store the updated compensation information correspondingly to the user identification information.

The method of providing the delivery item information according to the embodiments of the present disclosure may be provided in a form of a computer readable medium suitable for storing computer program instructions and data. A non-transitory computer readable storage medium according to an embodiment of the present disclosure may include a program which, when executed by a processor of a computer system, causes the processor to execute a method of providing the delivery item information. The method may include: activating a camera when an application program is executed; recognizing an identification code attached on a delivery item and photographed by the camera; requesting moving picture data corresponding to the identification code from a service server and receiving the moving picture data; and outputting moving picture corresponding to the moving picture data by superimposing on a real-time camera image acquired by the camera.

The program recorded on the recording medium may be read and installed in the computer and executed to perform the above-described functions.

In order to allow a computer to read a program recorded on a recording medium and to execute functions implemented by the program, the above-mentioned program may include codes that is written in computer languages such as C, C++, JAVA, and a machine language and can be read out by a processor through device interfaces of the computer.

Such codes may include a function code related to a function or the like that defines the above-described functions, and may include an execution procedure related control code necessary for a processor of the computer to execute the above-described functions according to a predetermined procedure. The codes may further include memory reference related codes as from which location (e.g. address) additional information or media required for the processor of the computer to execute the above described functions should be referenced in the internal or external memory of the computer.

In addition, when the processor of the computer needs to communicate with any other computer or server that is located in a remote site to execute the above-described functions, the codes may further include a communication-related code that represent how to communicate with another computer or the server, and what information or media should be transmitted or received during communication.

The computer-readable media suitable for storing the computer program instructions and data may include, for example, magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as the ROM, the RAM, the flash memory, erasable and programmable ROM (EPROM), and electrically erasable and programmable ROM (EEPROM). The processor and memory may be supplemented by or integrated with special purpose logic circuits.

The computer readable recording medium may be distributed to a plurality of computer systems that may be connected by a network so that computer readable code may be stored and executed in a distributed manner. The functional program for implementing the present disclosure in the distributed manner, and the related code and code segment may be contemplated and changed easily by programmers of the technical field of the present disclosure in consideration of this description and the system environment of the computer system with regard to reading and executing the program.

Each step in the embodiments of the present disclosure may be implemented by computer-executable instructions to be executed by the computing system. As used herein, the term "computing system" or "computer system" is defined as one or more software modules operating on electronic data, one or more hardware modules, or a combination thereof. For example, the definition of the computing system includes software modules such as a personal computer's operating system and hardware components of a personal computer. The physical layout of the module is insignificant. The computer system may include one or more computers connected through a network.

Similarly, the computing system may be implemented in a single physical device in which an internal module such as a memory and a processor operates in conjunction with performing an operation on the electronic data.

That is, the devices for performing the method for providing the delivery item information according to the present disclosure may be implemented to perform the above-described embodiments based on the computing system described below.

Figure 10:
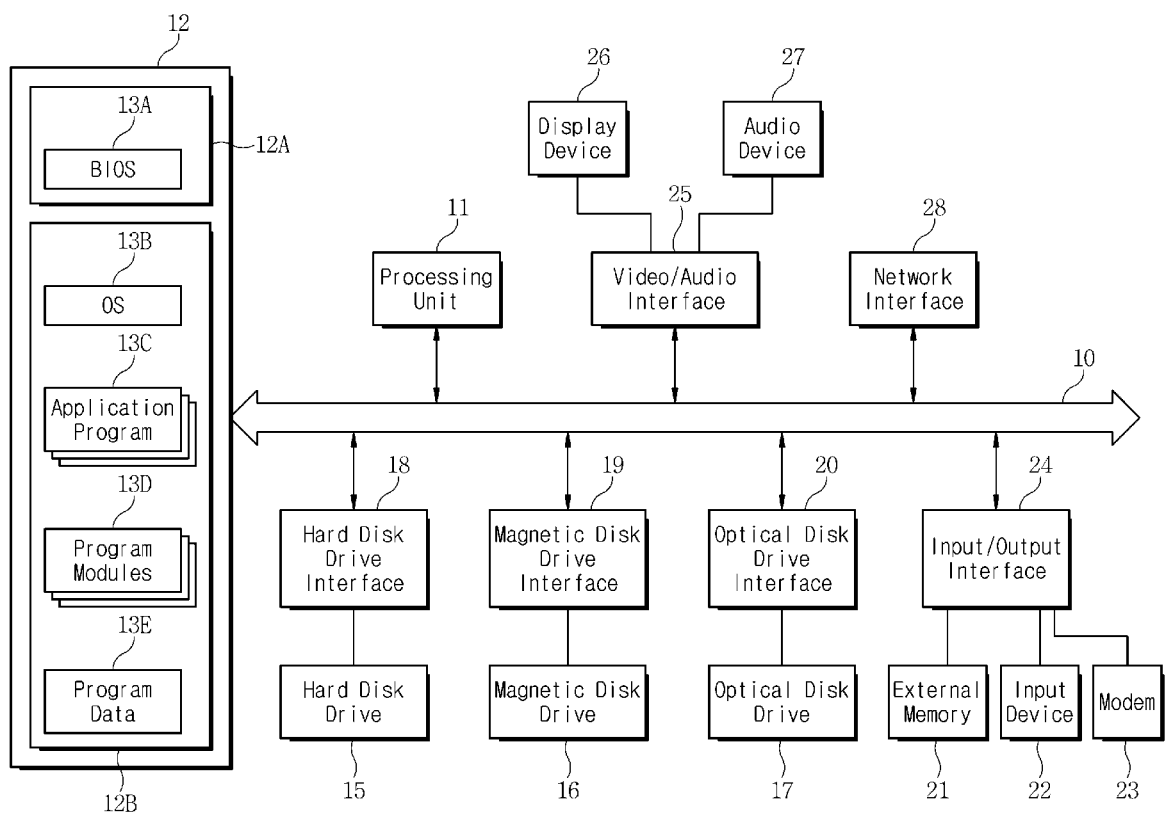
FIG. 10 is a block diagram illustrating an operating environment of a device for providing the delivery item information according to an embodiment of the present disclosure.

FIG. 10 is a block diagram illustrating an operating environment of a device for providing the delivery item information according to an embodiment of the present disclosure.

FIG. 10 and the following description are intended to provide a brief and general description of a suitable computing environment in which the present disclosure may be implemented. Although it is not required, the present disclosure may be described in connection with computer-executable instructions such as program modules that may be executed by a computer system. Generally, the program modules include routines, programs, objects, components, data structures, and so on suitable for performing particular tasks or implementing particular abstract data types. The computer-executable instructions, associated data structures, and program modules exemplify the program code means for carrying out processes described herein.

Referring to FIG. 10, an exemplary computing system suitable for implementing the present disclosure may include a processing unit 11, a system memory 12, and a system bus 10 that connects various system components including the system memory 12 to the processing unit 11.

The processing unit 11 is capable of executing computer-executable instructions designed to implement the features of the present disclosure.

The system bus 10 may be any of several types of bus architectures including a local bus, an external bus, and a memory bus. Alternatively, the system bus 10 may be any of the bus architectures employing a memory controller. The system memory 12 includes a read-only memory (ROM) 12A and a random access memory 12B. A Basic Input/Output System (BIOS) 13A which includes basic routines that help information transfer between components within the computing system when the system is booted may generally be stored in the ROM 12A.

The computing system may include storage devices. For example, the computing system may include a hard disk drive 15 that reads information from or writes information to a hard disk, a magnetic disk drive 16 that reads information from or writes information to a magnetic disk, and an optical disk drive 17 that reads information from or writes information to an optical disk such as a CD-ROM and other optical medium. The hard disk drive 15, the magnetic disk drive 16, and the optical disk drive 17 may be connected to the system bus 10 by a hard disk drive interface 18, a magnetic disk drive interface 19, and an optical drive interface 20, respectively.

Also, the computing system may further include an external memory 21 as one kind of the storage device. The external memory 21 may be connected to the system bus 10 through an input/output (I/O) interface 24.

The above-described drives and the computer-readable media that may be accessed by the drives allows nonvolatile storage of computer-executable instructions, data structures, program modules, and other data. The exemplary environment described herein illustrates the hard disk 15, the magnetic disk 16, and the optical disk 17, but other types of computer-readable media for storing data such as a magnetic cassette, a flash memory card, a DVD, a Bernoulli cartridge, a RAM, and a ROM may be used as well.

The program code means including one or more program modules that may be loaded and executed by the processing unit 11 and includes an operating system 13B, one or more application programs 13C, other program modules 13D, and program data 13E may be stored in the hard disk 15, the magnetic disk 16, the optical disk 17, the ROM 12A or the RAM 12B.

Also, the computing system may receive commands and information from a user through input devices 22 such as a keyboard, a pointing device, a microphone, a joystick, a game pad, and a scanner. These input devices 22 may be connected to the processing unit 11 via the I/O interface 24 connected to the system bus 10. The I/O interface 24 may logically represent at least one or a combinations of various interfaces such as, for example, a serial port interface, a PS/2 interface, a parallel port interface, a USB interface, an Institute of Electrical and Electronics Engineers (IEEE) 1394 interface (i.e., FireWire interface), and other interfaces.

In addition, the computing system may further include a display device 26 such as a monitor and a liquid crystal display (LCD), and an audio device 27 such as a speaker and a microphone. The display device 26 and the audio device 27 may be connected to the system bus 10 through a video/audio interface 25. Other peripheral devices (not shown) such as a speaker and a printer, for example, may be connected to the computing system. The video/audio interface 25 may include a High Definition Multimedia Interface (HDMI) and Graphics Device Interface (GDI).

The computing system may be connected to a network such as, for example, an office wide area network (WAN) or an enterprise WAN, a home network, Intranet, and/or Internet. The computing system may exchange data with external sources such as, for example, a remote computer system, a remote application, and/or a remote database.

To this end, the computing system may include a network interface 28 for receiving data from an external source and/or transmitting data to the external source.

The computing system may transmit and receive information to and from a remote device through the network interface 28. For example, in case that the computing system refers to the first beacon device 200, the computing system may communicate with the service device 400 through the network interface 28. On the other hand, in case that the computing system refers to the service device 400, the computing system may exchanged information with the first beacon device 200 through the network interface 28. The network interface 28 may represent a network interface card, or an equivalent software such as a network driver interface specification (NDIS) stack, an equivalent hardware, and/or a logical combination of the software and hardware.

Likewise, the computing system may transmit and receive data to and from an external source through the I/O interface 24. The I/O interface 24 may be connected to a modem 23 such as a standard modem, a cable modem, and a digital subscriber line (DSL) modem. The computing system may transmit and receive data to and from the external source through the modem 23.

Although FIG. 10 shows an operating environment suitable for the present disclosure, the principles of the present disclosure may be applicable to any other system capable of implementing the principles of the present disclosure with an appropriate modifications, if necessary. The environment shown in FIG. 10 is illustrative only and does not represent even a small portion of various environments in which the principles of the present disclosure may be implemented.

In addition, various information generated during the execution of the program according to the present disclosure may be stored and accessed in a computer-readable medium related with the computing system. For example, a portion of these program modules and a portion of the associated program data may be included in the operating system 13B, the application program 13C, the program module 13D, and/or the program data 13E to be stored in the system memory 12.

Further, when a mass storage device such as the hard disk is connected to the computing system, such program module and related program data may be stored in the mass storage device. In a networked environment, the program modules associated with the present disclosure, or portions thereof, may be stored in a remote computer system (e.g. a system memory related with a computing system of the first beacon device 100 and the service device 400, or a remote memory device such as a mass storage device) connected via the I/O interface 24 and the modem 23 or the network interface 25. The execution of such a module may be performed in a distributed environment as described above.

While the present specification contains a number of specific implementation details, it should be understood that they are not to be construed as limitations on the scope of any disclosure or claims, but as a description of features that may be specific to a particular embodiment of a particular disclosure. Certain features described with respect to contexts of independent embodiments may be implemented in combination in a single embodiment. Conversely, various features described in the context of a single embodiment may also be implemented in other embodiments either individually or in any suitable sub-combination. Further, although some features may be described to operate in a particular combination and may be initially depicted as so claimed, one or more features from the claimed combination may in some cases be excluded from the combination, and a claimed combination may be replaced by a sub-combination or a variant of the sub-combination.

Similarly, although the operations are depicted in the drawings in a particular order, it should not be understood that such operations need to be performed in that particular order or sequential order shown to achieve the desired result or all the depicted operations should be performed. In certain cases, multitasking and parallel processing may be advantageous. Also, the fragmentation of the various system components in the above-described embodiments should not be understood as requiring such fragmentation in all embodiments, and the program components and systems described above may generally be integrated together into a single software product or packaged into a multiple-function software product.

Although specific embodiments of the subject matter have been described herein, other embodiments are within the scope of the following claims. For example, the operations defined in the claims may be performed in a different order to still achieve desirable results. By way of example, the process illustrated in the accompanied drawings does not necessarily require that particularly illustrated sequence or sequential order to achieve the desired result. In certain implementations, multitasking and parallel processing may be advantageous.

The descriptions set forth above disclose the best mode of the present disclosure, and is provided to illustrate the disclosure and to enable those skilled in the art to make and use the disclosure. The written description is not intended to limit the disclosure to the specific terminology presented. Thus, although the present disclosure has been described in detail with reference to the above examples, those skilled in the art will be able to make adaptations, modifications, and variations on the examples without departing from the scope of the present disclosure.

Accordingly, the scope of the present disclosure should not be limited by the illustrated embodiments but should be defined by the appended claims.

According to the present disclosure, the receiver of the delivery item may photograph the identification code attached on the delivery item package and view the moving picture corresponding to the delivery item in the augmented reality form. Thus, the user may intuitively and easily check the contents and condition of the delivery item.

The apparatus according to the present disclosure may discriminate the legitimate user who photographs the identification code by the device and provide appropriate moving picture to the user. Thus, the present disclosure enables the carrier to ship and deliver item packages without exposure of the personal information, provides users with the unusual experience, and contribute to the development of shipping and delivery industries.

The present disclosure is industrially applicable because it can actually be implemented obviously and has a sufficiently high possibility of commercialization or sales.

The description of the disclosure is exemplary in nature and, thus, variations that do not depart from the substance of the disclosure are intended to be within the scope of the disclosure. Such variations are not to be regarded as a departure from the spirit and scope of the disclosure.

What is claimed is:

1. A method of providing delivery item information in a device, comprising:
    activating a camera to capture images;
    detecting, in the captured images, an identification code attached to a delivery item;
    detecting presence of a predetermined body part of a human object in the captured images;
    sending a request for moving picture data corresponding to the identification code and the predetermined body part to a service server;
    receiving the moving picture data from the service server responsive to sending the request;
    generating a moving picture by superimposing the moving picture data on portions of the captured images corresponding to the predetermined body part; and
    outputting the moving picture.

2. The method of claim 1, wherein the moving picture data comprises at least one of detailed information of the delivery item, advertisement information corresponding to the delivery item, or information designated by a user.

3. The method of claim 1, further comprising tracking a position of marker to translate or rotate playback frame of the moving picture data based on the position of the marker.

4. The method of claim 1, wherein sending the request comprises:
    transmitting, to the service server, user identification information.

5. The method of claim 4, wherein the user identification information comprises at least one of a phone number assigned to the device, facial identification information recognized through a front camera, or biometric information recognized through a biometric module.

6. The method of claim 1, wherein sending the request comprises:
    receiving a moving picture list corresponding to the identification code from the service server;
    displaying the moving picture list by combining the moving picture list with the captured images; and
    in response to a user input selecting a specific moving picture, requesting specific moving picture data corresponding to the specific moving picture from the service server as the requested moving picture data.

7. The method of claim 1, wherein the predetermined body part is a mouth or a palm.

* * * * *